(12) United States Patent
Ota et al.

(10) Patent No.: US 9,052,554 B2
(45) Date of Patent: Jun. 9, 2015

(54) LIQUID CRYSTAL DISPLAY PANEL

(75) Inventors: Akio Ota, Tottori (JP); Sachiko Watanabe, Tottori (JP)

(73) Assignee: Japan Display Inc., Tokyo (JP)

( * ) Notice: Subject to any disclaimer, the term of this patent is extended or adjusted under 35 U.S.C. 154(b) by 334 days.

(21) Appl. No.: 12/870,005

(22) Filed: Aug. 27, 2010

(65) Prior Publication Data
US 2011/0050551 A1 Mar. 3, 2011

(30) Foreign Application Priority Data

Sep. 2, 2009 (JP) ................. P2009-202330

(51) Int. Cl.
*G02F 1/1343* (2006.01)
*G02F 1/1362* (2006.01)
*G09G 3/36* (2006.01)
*G09G 3/32* (2006.01)

(52) U.S. Cl.
CPC ........ *G02F 1/134363* (2013.01); *G09G 3/3225* (2013.01); *G09G 3/3648* (2013.01); *G02F 1/136227* (2013.01); *G02F 2001/134372* (2013.01)

(58) Field of Classification Search
CPC G09G 3/3648; G09G 2300/08; G09G 3/3225
USPC .......................................................... 345/87
See application file for complete search history.

(56) References Cited

U.S. PATENT DOCUMENTS

| | | | |
|---|---|---|---|
| 7,636,144 B2 | 12/2009 | Horiguchi et al. | |
| 2002/0041354 A1 | 4/2002 | Noh et al. | |
| 2005/0030461 A1 | 2/2005 | Ono et al. | |
| 2005/0264731 A1 | 12/2005 | Itou et al. | |
| 2007/0195250 A1 | 8/2007 | Onogi et al. | |
| 2007/0222907 A1 | 9/2007 | Onogi et al. | |
| 2008/0180622 A1* | 7/2008 | Horiguchi et al. | ............ 349/139 |

FOREIGN PATENT DOCUMENTS

| | | |
|---|---|---|
| JP | 2002-182230 | 6/2002 |
| JP | 2005-338256 | 12/2005 |
| JP | 2007-256905 | 10/2007 |
| JP | 2007-264080 | 10/2007 |
| JP | 2007-293155 | 11/2007 |
| JP | 2008-180928 | 8/2008 |
| JP | 2009-036800 | 2/2009 |
| JP | 2009-104108 | 5/2009 |
| WO | 01-18597 | 3/2001 |

* cited by examiner

*Primary Examiner* — Kent Chang
*Assistant Examiner* — Chaycee Bibbee
(74) *Attorney, Agent, or Firm* — K&L Gates LLP

(57) ABSTRACT

A liquid crystal display panel includes: substrates arranged opposite to each other with a liquid crystal layer therebetween. One of the substrates includes scanning and signal lines arranged in a matrix in a display area, a common wiring line along a peripheral edge portion of the display area, an interlayer resin film at least over the whole display area, and lower and upper electrodes arranged opposite to each other with an inter-electrode insulating film therebetween. The upper electrode includes slits in each pixel area sectioned by the scanning and signal lines. One of the upper and lower electrodes is formed over the whole display area and connected to the common wiring line and operates as a common electrode. In the display area, a common line is formed in parallel to the scanning line, the electrode operating as the common electrode is connected to the common line through a contact hole and the common line is connected to the common wiring line at the peripheral edge portion.

6 Claims, 11 Drawing Sheets

LIQUID CRYSTAL DISPLAY PANEL

CROSS REFERENCES TO RELATED APPLICATIONS

The present application claims priority to Japanese Priority Patent Application JP 2009-202330 filed in the Japan Patent Office on Sep. 2, 2009, the entire contents of which is hereby incorporated by reference

BACKGROUND

The present application relates to a horizontal-electric field type liquid crystal display panel, particularly relates to a FFS (Fringe Field Switching) mode liquid crystal display panel in which an upper electrode or a lower electrode is formed over all sub-pixels in a display area as well as operates as a common electrode.

As the liquid crystal display panel is characterized by lightweight, thin and low power consumption as compared with a CRT (cathode ray tube), it is used for many electronic devices for display. The liquid crystal display panel displays images by changing the alignment of liquid crystal molecules aligned in a given orientation and changing the transmittance of light in a liquid crystal layer. The liquid crystal display panel includes a reflective type in which external light is incident on the liquid crystal layer, reflected at a reflector, transmitted through the liquid crystal again and emitted, a transmissive type in which incident light from a backlight device transmits through the liquid crystal layer and a semi-transmissive type having the both properties. There are a monochrome display type and a color display type in the liquid crystal display panel. The color of a pixel in the color-display type liquid crystal display panel is fixed by mixture of light transmitted through respective sub-pixels having color filters of three primary colors of light which are R (red), G (green) and B (blue) individually.

As a method of applying an electric field to the liquid crystal layer of the liquid crystal display panel, there are a vertical-electric field type and a horizontal-electric field type. In the vertical-electric field liquid crystal display panel, an approximately vertical electric field is applied to liquid crystal molecules by a pair of electrodes arranged opposite to each other so as to sandwich the liquid crystal layer. As the vertical-electric field liquid type crystal display panels, a TN (Twisted Nematic) mode, a VA (Vertical Alignment) mode, a MVA (Multi-domain Vertical Alignment) mode, an ECB (Electrically Controlled Birefringence) mode and the like are known. In the horizontal-electric field liquid crystal display panel, a pair of electrodes is provided at one of a pair of substrates arranged sandwiching the liquid crystal layer on the liquid crystal layer side so as to be insulated from each other, in which an approximately horizontal electric field is applied to liquid crystal molecules. As the horizontal-electric field type liquid crystal display panel, an IPS (In-Plane Switching) mode in which a pair of electrodes do not overlap each other in planar view and a FFS mode in which they overlap each other. As the horizontal-electric field type liquid crystal display panel has an advantage of obtaining a wide viewing angle, it becomes widely used in recent years.

As the pair of electrodes is provided in the same layer in the IPS mode liquid crystal display panel, there are problems in which liquid crystal molecules positioned on the upper side of the pixel electrode are not sufficiently driven, and that, a low aperture ratio and a low transmittance may arise. Accordingly, the FFS mode liquid crystal display panel disclosed in JP-A-2009-036800 (Patent Document 1) and JP-A-2008-180928 (Patent Document 2) has been developed. In the FFS mode liquid crystal display panel disclosed in Patent Document 1, a lower electrode operates as a common electrode and the common electrode is formed so as to be separated in each sub-pixel. A common line is formed in the same layer parallel to a scanning line connected to a gate electrode of a thin film transistor TFT for driving the pixel electrode so that the common electrode partially overlaps with the common line, thereby performing wiring of the common electrode with respect to each sub-pixel.

As described above, the common electrode in the FFS mode liquid crystal display panel disclosed in Patent Document 1 overlaps with the common line, therefore, a level difference occurs and affects the upper electrodes, as a result, alignment of liquid crystal molecules is disordered at a part corresponding to the level difference. Accordingly, in the liquid crystal display panel disclosed in Patent Document 2, an interlayer resin film also called a planarization film is formed on TFTs and lower electrodes, the lower electrodes operating as pixel electrodes are formed on the interlayer resin film, an inter-electrode insulating film and an upper electrode operating as a common electrode are formed in order. The common electrode is formed over all sub-pixels in the display area, the liquid crystal display panel is characterized by higher aperture ratio and higher contrast as compared with the liquid crystal display panel disclosed in Patent Document 1.

SUMMARY

As shown in FIG. 3 and FIG. 5 of Patent Document 2, the upper electrode formed over all sub-pixels in the display area as the common electrode is connected to a common wiring line by a contact hole in a non-display area formed on the fringe of the display area. The upper electrode as the common electrode of the FFS mode liquid crystal display panel in related art is connected to the common wiring line only in the non-display area. On the other hand, a slit opening is formed in each sub-pixel in the upper electrode, therefore, the resistance as the common electrode is increased with high resistivity of a transparent conductive material forming the upper electrode. Accordingly, when the FFS mode liquid crystal display panel becomes large in size, the potential of the common electrode becomes unstable due to the high resistivity of the upper electrode as the common electrode, which causes characteristic failures such as flickers and crosstalk. Such points are problems arising also in the FFS mode liquid crystal display panel in a type in which the lower electrode is operated as the common electrode.

Thus, it is desirable to provide a FFS mode liquid crystal display panel having good display quality in which flickers, crosstalk and so on hardly occur by reducing the resistance of the common electrode formed over all sub-pixels in the display area.

According to an embodiment, there is provided a liquid crystal display panel including a pair of substrates arranged opposite to each other with a liquid crystal layer sandwiched therebetween. One of the pair of substrates includes plural scanning lines and signal lines arranged in a matrix state in a display area, a common wiring line formed along a peripheral edge portion of the display area, an interlayer resin film formed at least over the whole display area and a lower electrode and an upper electrode made of a transparent conductive material arranged opposite to each other with an inter-electrode insulating film sandwiched therebetween. The upper electrode includes plural slits formed in each pixel area sectioned by the scanning line and the signal line in the display area in planar view. One of the upper electrode and the lower electrode is formed over the whole surface of the display area as well as electrically connected to the common wiring line and operates as a common electrode. In the display area, a common line is formed in parallel to the scanning line and the electrode operating as the common electrode in the upper electrode and the lower electrode is electrically connected to the common line through a contact hole as well as the common line is electrically connected to the common wiring line at the peripheral edge portion of the display area.

There exists the FFS mode liquid crystal display panel in which one of the upper electrode and the lower electrode is formed over all sub-pixels in the display area and operates as the common electrode. In the liquid crystal display panel having the above structure in related art, the common electrode is electrically connected to the common wiring line only in the non-display area. Accordingly, in the middle-sized to large-sized liquid crystal display panels having the wide display area, the resistance of the common electrode made of a non-transparent conductive material such as ITO or IZO is extremely increased, which may cause characteristic failures such as flickers and crosstalk. The tendency appears more prominent in the panel in which the upper electrode operates as the common electrode because slit openings are formed at the upper electrode and the area of the upper electrode is reduced.

In the liquid crystal display panel according to the embodiment, the common line is formed in parallel to the scanning line and the common electrode is electrically connected to the common line as well as the common line is electrically connected to the common wiring line at a fringe portion of the display area. Accordingly, the electrode operates as the common electrode in the upper electrode and the lower electrode is electrically connected to the common wiring line at the fringe portion of the display area as well as electrically connected to the common wiring line at the fringe portion of the display area through the common line, therefore, the resistance with respect to the common electrode is reduced. In the liquid crystal display panel according to the embodiment, the electrical connection between the common line and the common wiring line at the fringe portion of the display area can be executed in a state of being electrically insulated from other wiring easily by bridge connection by a connection electrode formed with the signal line.

In the liquid crystal display panel according to the embodiment, it is preferable that at least one relay terminal is formed between the common line and the common electrode at a position where the relay terminal overlaps with the contact hole, in which the electrode operating as the common electrode in the upper electrode and the lower electrode is electrically connected to the relay terminal to be electrically connected to the common line through the relay terminal.

Concerning the contact hole, the opening of the contact hole is increased as the thickness of the layer to be pierced through is increased due to characteristics of the forming method. Particularly, the thickness of the layer is increased when there is the interlayer insulating film, therefore, the aperture of the contact hole is increased and the aperture rate of the liquid crystal display panel is reduced. In the liquid crystal display panel according to the embodiment, at least one relay terminal is formed between the common line and the common electrode at a position in which the relay terminal overlaps with the contact hole in planar view, thereby reducing the layer through which the contact hole pierces and reducing the size of the aperture of the contact hole. Accordingly, the size of the aperture of the contact hole can be reduced, which can reduce the reduction of the aperture ratio due to the contact hole.

In the liquid crystal display panel according to the embodiment, it is preferable that the relay terminal is formed in the same layer as the signal line.

In the liquid crystal display panel according to the embodiment, the signal line and the relay terminal can be formed at the same time, therefore, the relay terminal can be formed without increasing manufacturing process.

In the liquid crystal display panel according to the embodiment, it is preferable that a connection portion between the electrode operating as the common electrode in the upper electrode and the lower electrode and the relay terminal does not overlap with a connection portion between the relay terminal and the common line in planar view.

In the liquid crystal display panel according to the embodiment, the electrode operating as the common electrode in the upper electrode and the lower electrode is electrically connected to the common line through the contact hole. As the connection portion between the electrode operating as the common electrode in the upper electrode and the lower electrode and the relay terminal does not overlap with the connection portion between the relay terminal and the common line in planar view in the liquid crystal display panel according to the embodiment, the thickness of the layer through which the contact hole pierces is reduced, thereby reducing the aperture area of the contact hole. Additionally, at the connection portion for electrically connecting the relay terminal to the common line, the area necessary for forming the connection portion can be reduced. Accordingly, in the liquid crystal display panel according to the embodiment, the area necessary for forming the connection portion between the electrode operating as the common electrode in the upper electrode and the lower electrode and the relay terminal as well as the connection portion between the relay terminal and the common line is reduced, therefore, the reduction of the aperture ratio due to these connection portions can be suppressed.

Additionally, the liquid crystal display panel according to the embodiment can be applied to the case in which the connection portion between the electrode operating as the common electrode in the upper electrode and the lower electrode and the relay terminal overlaps with the connection portion between the relay terminal and the common line in planar view, however, when the overlapping area is partial, the concave portion is formed on the common electrode side at the overlapping area. As recovery failure is liable to occur at the concave portion on the common electrode side, there is the danger of breaking. In the liquid crystal display panel according to the embodiment, the connection portion between the electrode operating as the common electrode in the upper electrode and the lower electrode does not overlap with the connection portion between the relay terminal and the common line in planar view, therefore, small concavity and convexity are hardly occur on the common electrode side, which leads to the reduction of breaking failure on the common electrode side.

In the liquid crystal display panel according to the embodiment, it is preferable that the common line is formed so as to shield an opening of the contact hole at a position in which the common line overlaps with the contact hole in planar view.

Alignment failures of the liquid crystal molecules occur at the opening of the contact hole. In the liquid crystal display panel according to the embodiment, the area where the alignment failures occur is not visible from the outside by shielding the opening of the contact hole by the non-transparent common line, therefore, the liquid crystal display panel having good display quality can be obtained.

In the liquid crystal display panel according to the embodiment, it is preferable that the relay terminal is made of an non-transparent material and formed so as to shield the opening of the contact hole in planar view.

Alignment failures of the liquid crystal molecules occur at the opening of the contact hole. In the liquid crystal display panel according to the embodiment, the area where the alignment failures occur is not visible from the outside by shielding the opening of the contact hole by covering the contact hole with the non-transparent relay terminal, therefore, the liquid crystal display panel having good display quality can be obtained.

In the liquid crystal display panel according to the embodiment, it is preferable that a first slit opening area and a second slit opening area in which rotation directions of liquid crystal molecules are reverse to each other are formed on the upper electrode and the common line is formed at a boundary between the first and the second slit opening areas.

The disclination is liable to occur at the boundary of areas of the first and second slit openings in which rotation directions of liquid crystal molecules are reverse to each other. In the liquid crystal display panel according to the embodiment, the area where such disclination is liable to occur is shielded by the non-transparent common line, therefore, the area where the disclination is liable to occur is not visible from the outside, thereby obtaining the liquid crystal display panel having good display quality.

Additional features and advantages are described herein, and will be apparent from the following Detailed Description and the figures.

DETAILED DESCRIPTION

The present application is described below in detail with reference to the drawings according to an embodiment. The detailed description is provided as follows:

In the description, "surface" of an array substrate and a color filter substrate indicates a surface on which various kinds of wiring is formed or a surface on a side opposite to liquid crystal. In respective drawings used for explanation in the specification, respective layers and respective members are shown in different contraction scales to allow respective layers and respective members to be sizes recognizable on the drawings, which are not shown in proportion to actual sizes.

First Embodiment

Figure 1A:
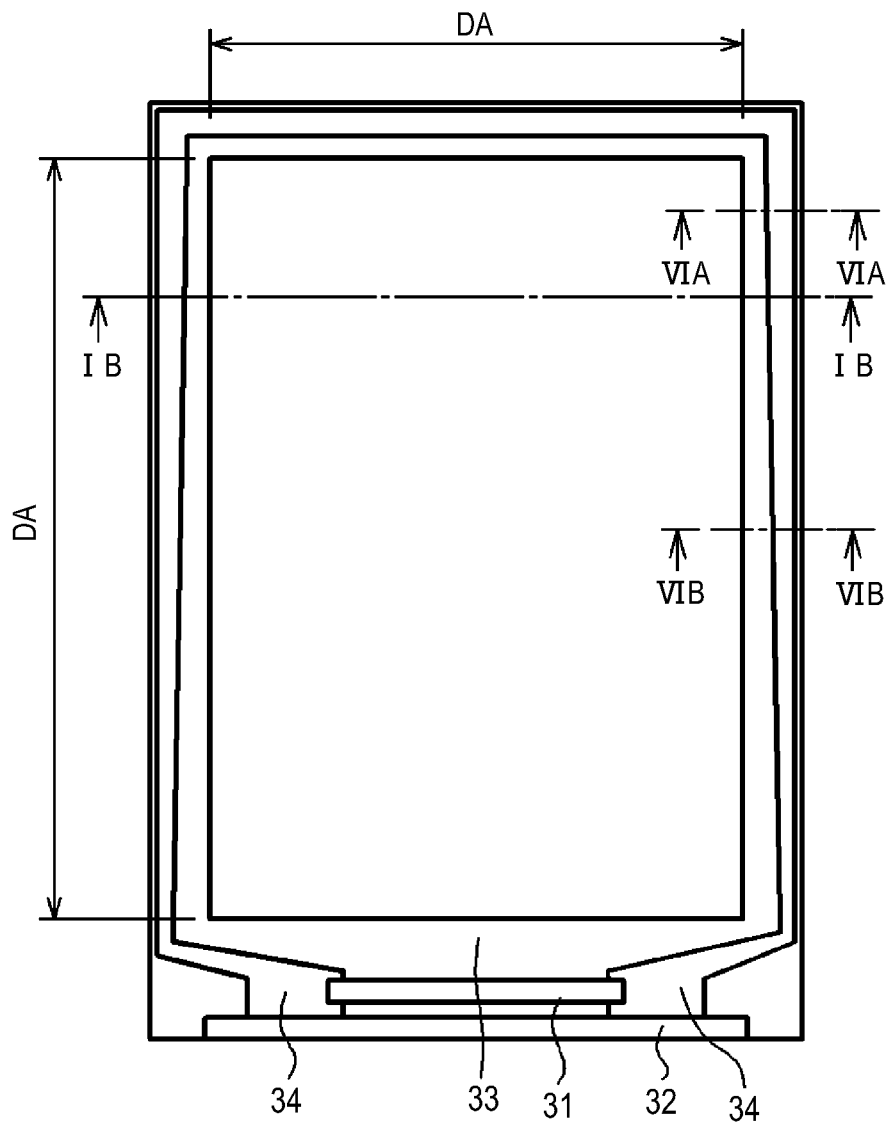
FIG. 1A is a plan view showing the outline of a liquid crystal display panel according to a first embodiment and FIG. 1B is a cross-sectional view taken along the line IB-IB of FIG. 1A.
Figure 1B:
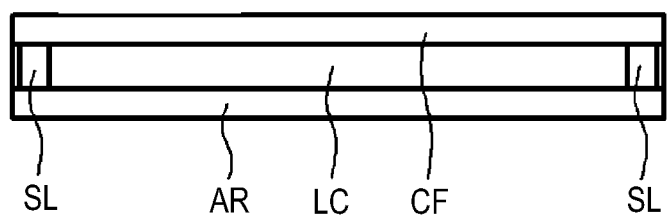

A liquid crystal display panel 10A according to a first embodiment will be explained with reference to FIGS. 1A, 1B to FIGS. 6A, 6B. In the liquid crystal display panel 10A, a liquid crystal layer LC is sandwiched between an array substrate AR and a color filter substrate CF as shown in FIG. 3. The liquid crystal layer LC is sealed by a sealant SL so as not to be leaked from between the array substrate AR and the color filter substrate CF as shown in FIG. 1B, and the thickness of the liquid crystal layer LC is maintained to be uniform by columnar spacers (not shown). Polarizing plates (not shown) are formed respectively at the back surface of the array substrate AR and at the front surface of the color filter substrate CF. From the back surface of the array substrate AR, light is irradiated by a backlight (not shown) to the liquid crystal display panel 10A. Though not shown, the liquid crystal display panel 10A includes plural pixels aligned in the row direction and the column direction in a display area DA, and one pixel includes sub-pixels 11 (refer to FIG. 2) of, for example, R (red), G (green) and B (blue), and the color of each pixel is made by mixture of light of respective colors.

Figure 2:
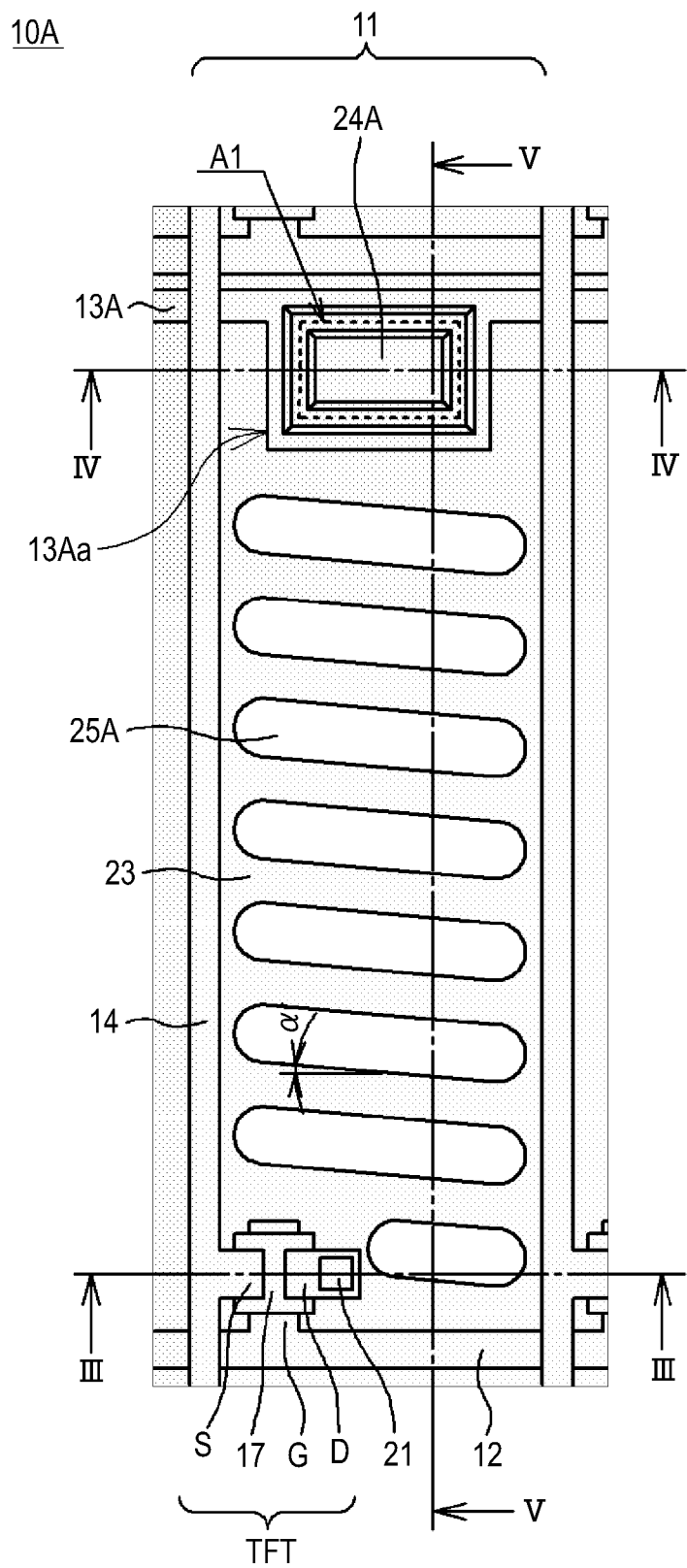
FIG. 2 is a plan view showing the outline of an array substrate of one sub-pixel according to the first embodiment.
Figure 3:
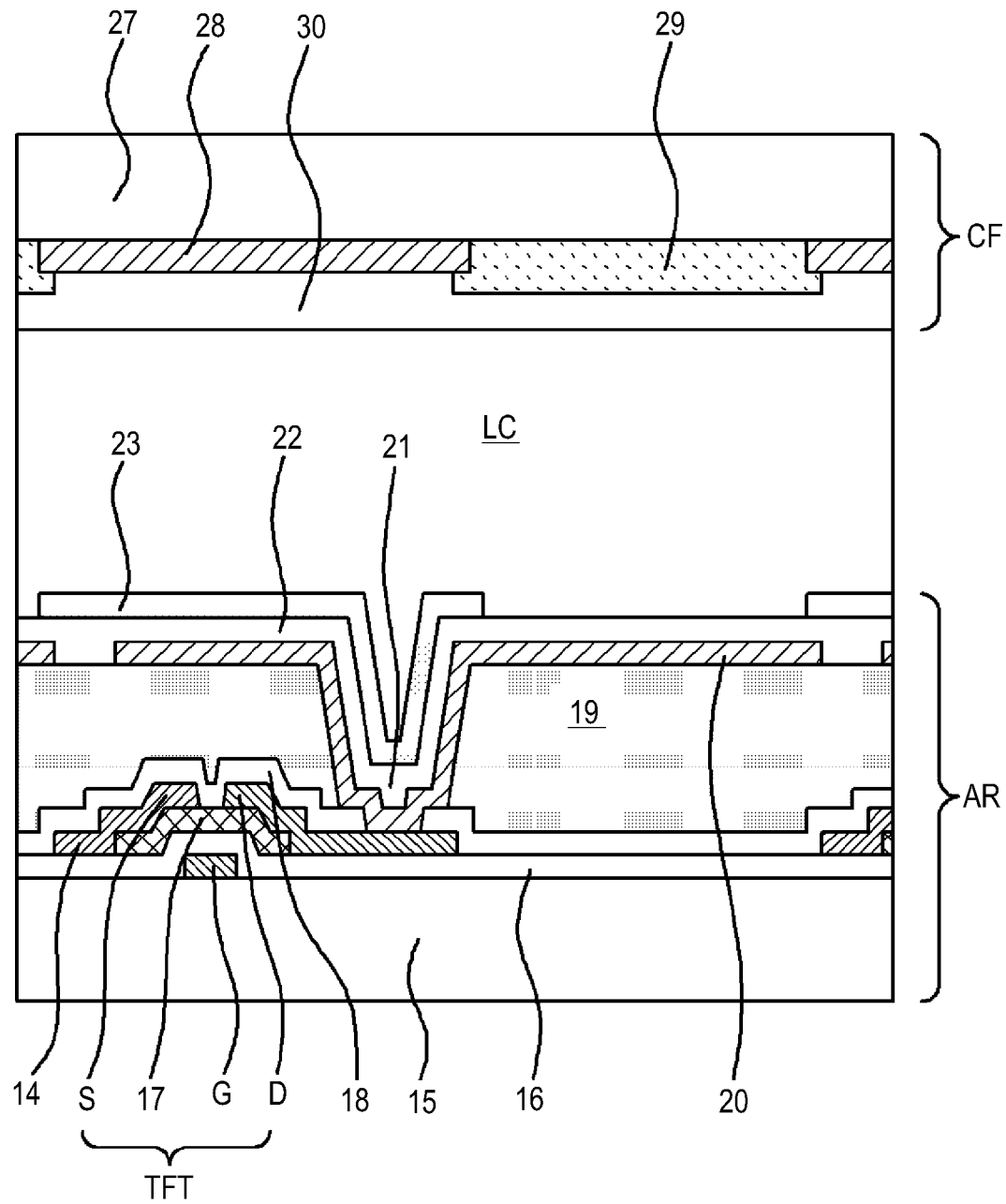
FIG. 3 is a cross-sectional view taken along the line III-III of FIG. 2.

Each sub-pixel 11 formed on the array substrate AR includes a scanning line 12 and a common line 13A made of non-transparent metal such as aluminum or molybdenum extending in a row direction as shown in FIG. 2, a signal line 14 made of non-transparent metal such as aluminum or molybdenum extending in a column direction and a TFT arranged near an intersection of the scanning line 12 and the signal line 14.

As shown in FIG. 3 to FIGS. 6A, 6B, the array substrate AR includes a first transparent substrate 15 made of transparent glass, quartz, plastic and so on having insulating performance as a base substance. The scanning line 12 and the common line 13A are formed on the first transparent substrate 15 at the surface facing the liquid crystal layer LC. As shown in FIG. 2, a gate electrode G is extended from the scanning line 12 and a common connection portion 13Aa is extended from the common line 13A. A transparent gate insulating film 16 made of silicon nitride or a silicon oxide is stacked so as to cover the scanning line 12 and the gate electrode G. A semiconductor layer 17 made of amorphous silicon and polycrystal silicon is formed on the gate insulating film 16 at a portion where the semiconductor layer 17 overlaps with the gate electrode G in planer view. Also on the gate insulating film 16, plural signal lines 14 made of metal such as aluminum or molybdenum are formed in the column direction of FIG. 1A. Each area sectioned by the scanning line 12 and the signal line 14 will be a sub-pixel area 11. A source electrode S is extended from the signal line 14 and the source S partially touches the surface of the semiconductor layer 17.

Furthermore, a drain electrode D made of the same material as the signal line 14 and the source electrode S which was made on the same process is provided over the gate insulating film 16, and the drain electrode D is arranged near the source electrode S and partially touches the surface of the semiconductor layer 17. Three sub-pixels 11 of R (red), G (green) and B (blue) constitute one pixel (not shown) having an approximately square, therefore, the sub-pixel 11 dividing the pixel into equally three is a rectangle whose short edge is along the scanning line 12 and whose long edge is along the signal line 14. The gate electrode G, the gate insulating film 16, the semiconductor layer 17, the source electrode S and a drain electrode D constitute a TFT to be a switching element, and the TFT is formed in each sub-pixel 11.

Additionally, a transparent passivation film 18 made of, for example, silicon nitride and silicon oxide is stacked so as to cover the signal line 14, the TFT and an exposed portion of the gate insulating film 16. An interlayer resin film 19 made of a transparent resin material such as photoresist is stacked so as to cover the passivation film 18. An irregular surface of the passivation film 18 due to the signal line 14, the TFT and the gate insulating film 16 is planarized by the interlayer resin film 19. Then, a lower electrode 20 made of a transparent conducive material such as ITO (Indium Thin Oxide) or IZO (Indium Zinc Oxide) is formed so as to cover the interlayer resin film 19. A first contact hole 21 reaching the drain electrode D is formed so as to pierce through the interlayer insulating film 19 and the passivation film 18, and the lower electrode 20 and the drain electrode D are electrically connected through the first contact hole 21. Therefore, the lower electrode 20 operates as a pixel electrode.

A transparent inter-electrode insulating film 22 made of, for example, silicon nitride or silicon oxide is stacked so as to cover the lower electrode 20. Then, an upper electrode 23 made of a transparent conductive material such as ITO or IZO is formed so as to cover the inter-electrode insulating film 22. At a connection portion A1, a second contact hole 24A reaching to the common line 13A is formed so as to pierce through the inter-electrode insulating film 22, the lower electrode 20, the interlayer resin film 19, the passivation film 18 and the gate insulating film 16. The upper electrode 23 and the common line 13A are electrically connected through the second contact hole 24A. Therefore, the upper electrode 23 operates as the common electrode.

Figure 4:
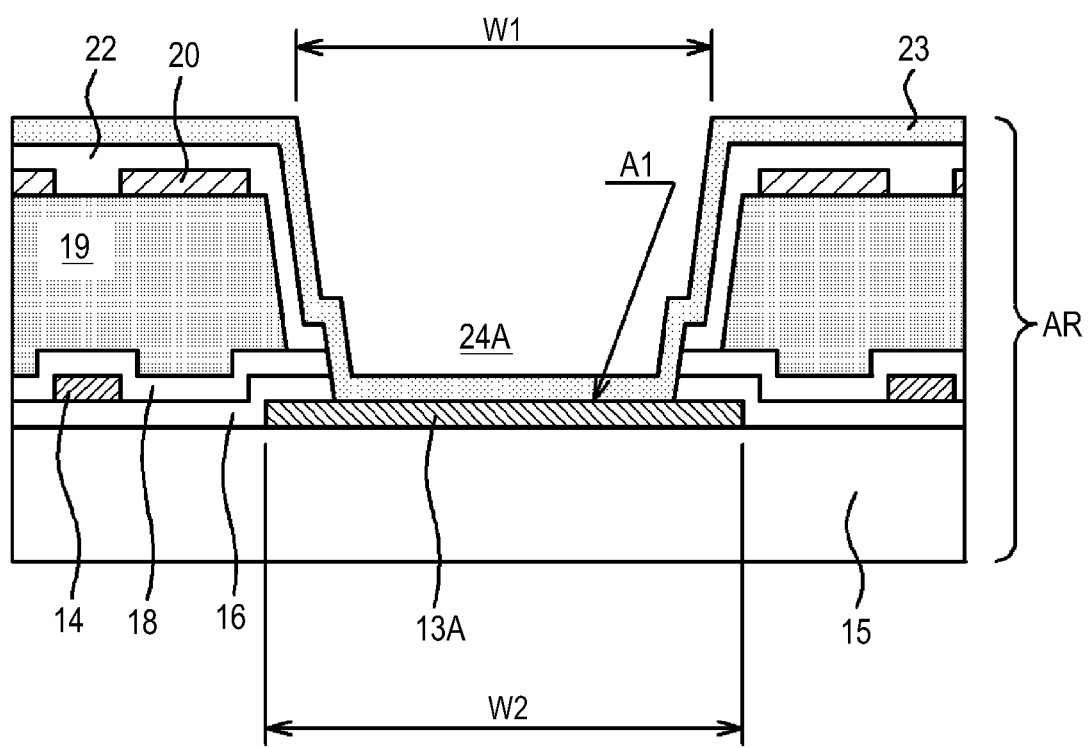
FIG. 4 is a cross-sectional view taken along the line IV-IV of FIG. 2.
Figure 5:
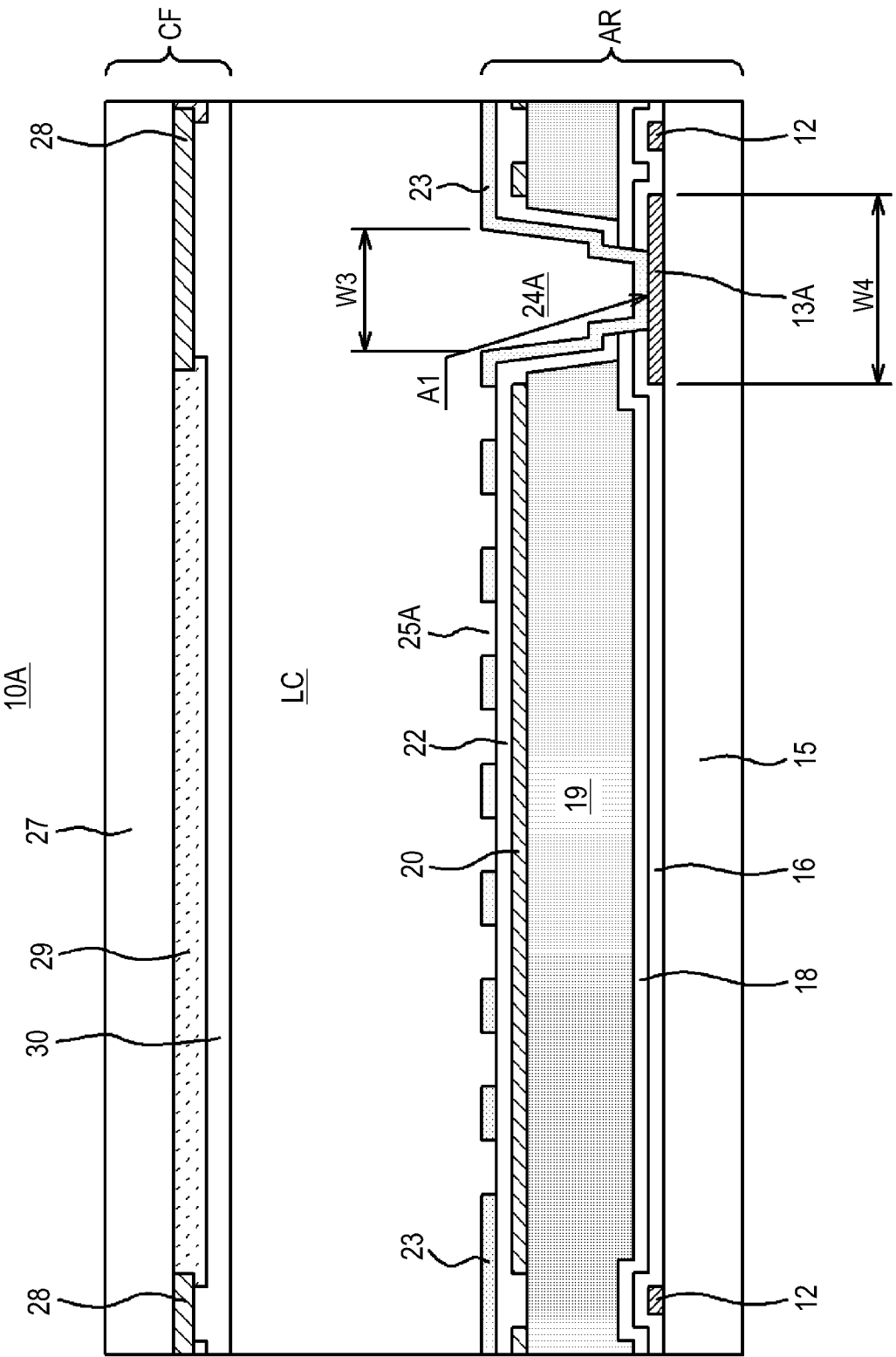
FIG. 5 is a cross-sectional view taken along the line V-V of FIG. 2.

As shown in FIG. 4, a width W2 of the common line 13A at the connection portion A1 in the row direction is wider than the maximum width W1 of a concave portion of the second contact hole 24A in the row direction in the display area (W1<W2). As shown in FIG. 5, a width W4 of the common line 13A of the connection portion A1 in the column direction is wider than the maximum width W3 of the concave portion of the second contact hole 24A in the column direction in the display area (W3<W4). The common line 13A of the connection portion A1 is formed so as to be wider than the concave portion of the second contact hole 24A in planar view as described above, thereby shielding an alignment failure portion of liquid crystal molecules due to the concave portion of the second contact hole 24A because the common line 13A of the connection portion A1 is made of a metal material having light shielding effect.

Plural slit openings 25A are formed in the upper electrode 23 as shown in FIG. 2. The slit openings 25A are formed in a manner in which a transparent conductive material such as ITO or IZO is formed on the inter-electrode insulating film 22 and a photoresist material applied on the surface of the transparent conductive material is exposed and developed, then, the transparent conductive material is etched. Then, a first alignment layer (not shown) made of, for example, polyimide is stacked so as to cover the surface of the upper electrode 23 and the slit openings 25A. The rubbing processing is performed to the first alignment film, for example, in the right direction of FIG. 2, namely, in a direction parallel to the scanning line 12. The rubbing processing is performed by rubbing the alignment film by rubbing cloth having minute fibers to form many minute grooves along one direction on the alignment film. The direction of rubbing processing is slanted at a given angle α with respect to the extending direction of the slit openings 25A, thereby rotating the liquid crystal molecules in one direction. The angle α differs according to various conditions, and it is preferable to be selected so as to be three to fifteen degrees.

The color filter substrate CF includes a second transparent substrate 27 made of transparent glass, quartz, plastic and so on having insulating performance as a base substance as FIG. 3 and FIG. 5. On the surface of the second transparent substrate 27, a light shielding layer 28 made of metal or resin having light shielding effect is formed at positions opposite to the scanning line 12, the common line 13A, the connection portion A1, the signal line 14 and the TFT of the array substrate AR and a color filter layer 29 transmitting light of colors (for example, R, B, and G, or achroma) different according to each sub-pixel 11 is formed.

Furthermore, an overcoat layer 30 made of a transparent resin material such as photoresist is stacked so as to cover the light shielding layer 28 and the color filter layer 29. The overcoat layer 30 is formed for planarizing level differences by the color filter layers 29 having different colors as well as shielding the liquid crystal layer LC from impurities flowing from the light shielding layer 28 and the color filter layer 29. Additionally, a second alignment film (not shown) made of, for example, polyimide is formed so as to cover the overcoat layer 30. The rubbing processing in the direction reverse to the first alignment layer is performed to the second alignment layer. The array substrate AR and the color filter substrate CF formed in the above manner are allowed to face each other, the both substrates are bonded by providing the sealant SL (refer to FIG. 1B) at the circumference of both substrates and liquid crystal with homogeneous alignment is filled between both substrates to thereby obtain the liquid crystal display panel 10A according to the embodiment. The distance between the array substrate AR and the color filter substrate CF is maintained to be fixed by columnar spacers (not shown) formed on any of both substrates.

According to the above structure, when the TFT is turned on at each sub-pixel 11, an electric field is generated between the lower substrate 20 and the upper substrate 23 to change the alignment of liquid crystal molecules in the liquid crystal layer LC. Accordingly, the light transmittance of the liquid crystal layer LC is changed and images are displayed in the FFS mode. An area in which the lower electrode 20 faces the upper electrode 23 sandwiching the inter-electrode insulating film 22 forms an auxiliary capacitor, in which the electric field between the lower electrode 20 and the upper electrode 23 is held for a given period of time when the TFT is turned off.

Next, wiring of the upper electrode 23 and the common line 13A in a non-display area in FIG. 1A (an area other than the display area DA shown in FIG. 1A) will be explained with reference to FIGS. 6A, 6B. In the non-display area, a driver terminal portion 31 having plural terminals to which a driver IC (not shown) is connected, a flexible printed board terminal portion 32 having plural terminal to which a flexible printed board (not shown) connected to an external controller is connected, a first wiring portion 33 in which respective wiring for leading the scanning line 12, the common line 13A and the signal line 14 to the driver terminal portion 31 and the flexible printed board terminal portion 32 is formed and a second wiring portion 34 in which wiring for leading the upper electrode 23 to the driver terminal portion 31 and the flexible printed board terminal portion 32 is formed.

Figure 6A:
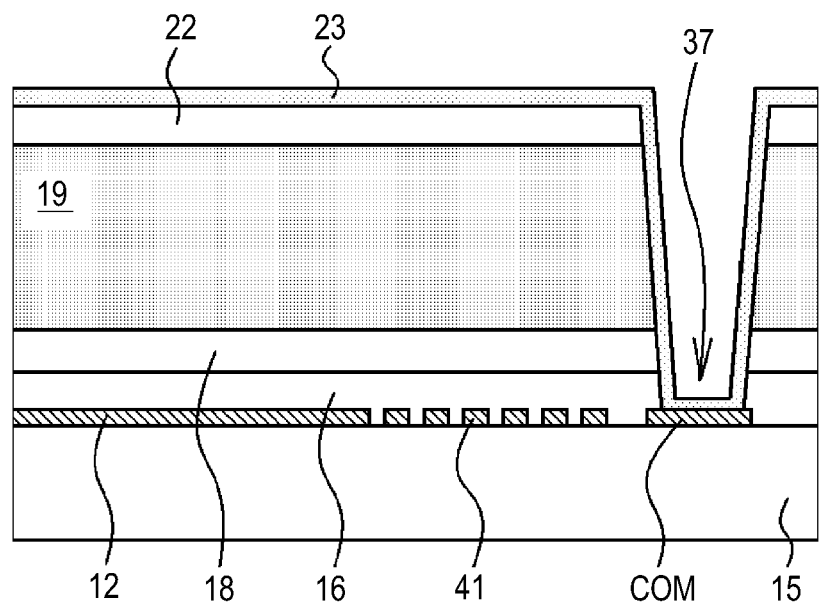
FIG. 6A is a cross-sectional view taken along the line VIA-VIA of the array substrate of FIG. 1A

The upper electrode 23 formed over all sub-pixels in the display area DA and operates as the common electrode is connected to a common wiring line COM in the second wiring portion 34 through a contact hole 37 formed so as to pierce through the inter-electrode insulating film 22, the interlayer resin film 19, the passivation film 18 and the gate insulating film 16 as shown in FIG. 6A. It is also preferable that the interlayer resin film 19 is not formed in the non-display area and the contact hole is formed so as to pierce through the inter-electrode insulating film 22, the passivation film 18 and the gate insulating film 16 to connect the upper electrode 23 to the common wiring line COM in the second wiring portion 34.

Figure 6B:
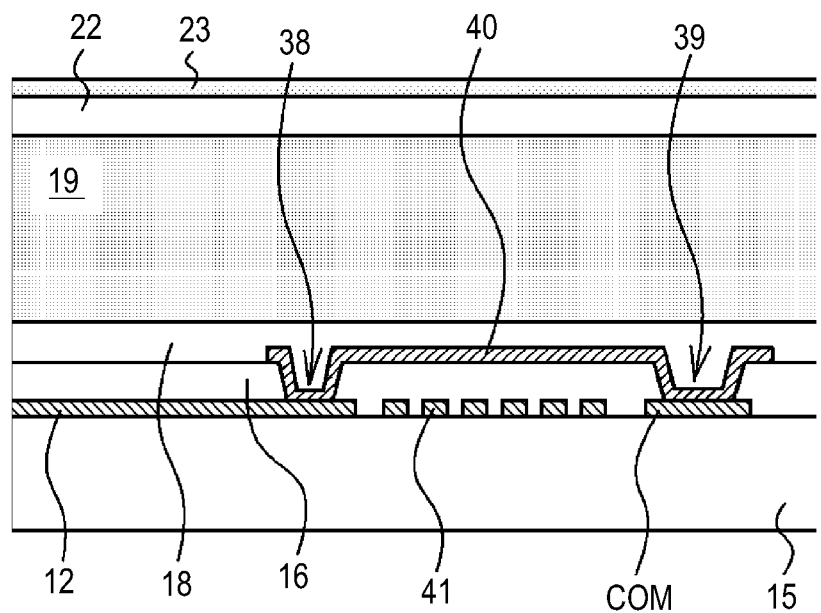
FIG. 6B is a cross-sectional view taken along the line VIB-VIB of the array substrate of FIG. 1A.

As shown in FIG. 6B, the common line 13A is connected to a bridge electrode 40 made of the same material as the signal line 14 through a contact hole 38 formed in the gate insulating film 16 positioned on the scanning line 12. The bridge electrode 40 is connected to the common wiring line COM through a contact hole 39 formed in the gate insulating film 16 positioned on the common wiring line COM. Therefore, the common line 13A is in a state of being connected to the common wiring line COM of the second wiring portion 34 by the bridge electrode 40 in a state of being electrically insulated from a wiring 41 of the scanning line 12.

As described above, the upper electrode 23 operating as the common electrode of the embodiment is not only connected to the common wiring line COM in the non-display area but also connected to the common wiring line COM in the display area DA by the common line 13A made of a material having low resistance including metal such as aluminum or molybdenum, therefore, the resistance will be low. Accordingly, it becomes possible to reduce characteristic failures such as flickers and crosstalk due to the high resistance of the common electrode in related art even in the middle sized to the large sized FFS-mode liquid crystal display devices.

Second Embodiment

Next, a liquid crystal display panel 10B according to a second embodiment will be explained with reference to FIG. 7 and FIGS. 8A, 8B. In the liquid crystal display panel 10B of the second embodiment, the same reference numerals are given to portions having the same structure as the liquid crystal display panel 10A of the first embodiment, in which a subscript of the reference numerals is changed to "B" and the detailed description thereof is omitted. The liquid crystal display panel 10B of the second embodiment differs from the liquid crystal display panel 10A of the first embodiment mainly in the shape of slit openings 25B and arrangement of a common line 13B.

Figure 7:
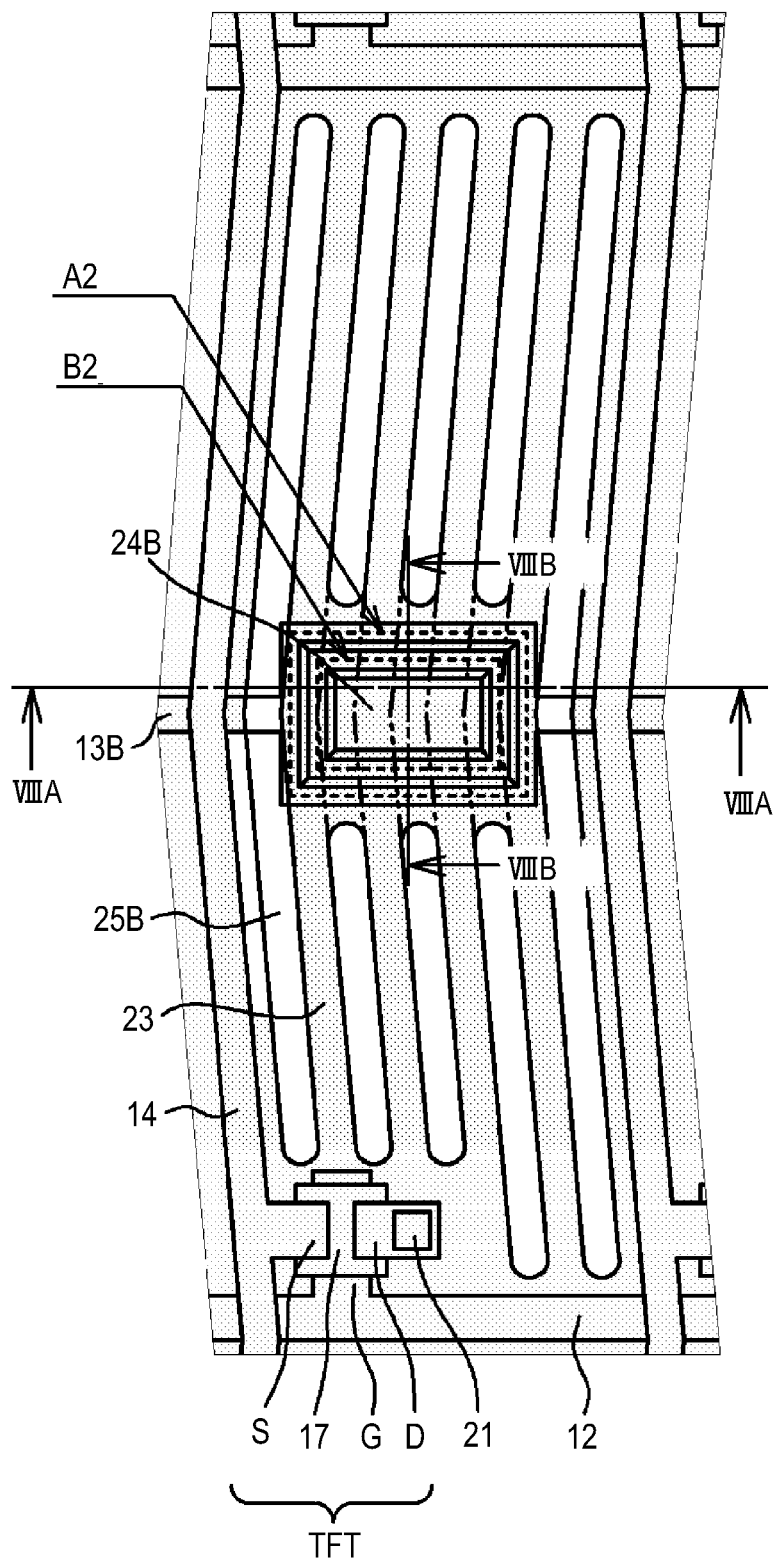
FIG. 7 is a plan view showing the outline of the array substrate of one sub-pixel according to a second embodiment.

In the liquid crystal display panel 10B according to the second embodiment, plural slit openings 25B having a dog-leg shape extending along the extending direction of the signal line 14 are formed in the upper electrode 23 at equal intervals as shown in FIG. 7. As the sub-pixel 11 is longer than is wide, the number of slit openings at both ends is increased when the slit openings are extended in the horizontal direction. The edge portions of the slit openings will be abnormal alignment areas of liquid crystal molecules, which may lead to the reduction of aperture ratio. Accordingly, in the liquid crystal display panel 10B according to the second embodiment, the extending direction of the slit openings 25B is allowed to be the vertical direction, thereby reducing the number of the edge portions of the slit openings 25B to reduce the reduction of aperture ratio.

In this case, the direction of rubbing processing is in the column direction which is the same as the extending direction of the signal line 14. The extending directions of the slit openings 25B having the dog-leg shape are slanted by +5 degrees as well as −5 degrees with respect to the direction of rubbing processing. When all slit openings 25B are allowed to be slanted only in any one of the clockwise direction and the counterclockwise direction with respect to the direction of rubbing processing, the liquid crystal molecules will be twisted in one direction, therefore, a phenomenon in which the color changes according to the viewing angle direction appears. The phenomenon is caused because apparent retardation of liquid crystal molecules is changed according to the viewing direction. In order to reduce the phenomenon, the liquid crystal display panel 10B of the second embodiment has a domain in which the extending direction of the slit openings 25B is slanted at +5 degrees and a domain in which the direction is slanted at −5 degrees with respect to the clockwise direction. In this case, the example in which the signal line 14 has also the dog-leg shape along the slit openings 25B is shown, however, the signal line 14 may be a straight line.

As shown in FIG. 7, the common line 13B of the liquid crystal display panel 10B of the second embodiment is formed at a bending portion of the slit opening 25B. Accordingly, a second contact hole 24B for connecting the common line 13B to the upper electrode 23 is also formed at the bending portion of the slit openings 25B. According to the structure, disclination generated at a boundary between areas of two kinds of slit openings in which rotation directions of liquid crystal molecules are different from each other can be shielded by the non-transparent common line 13B.

Figure 8A:
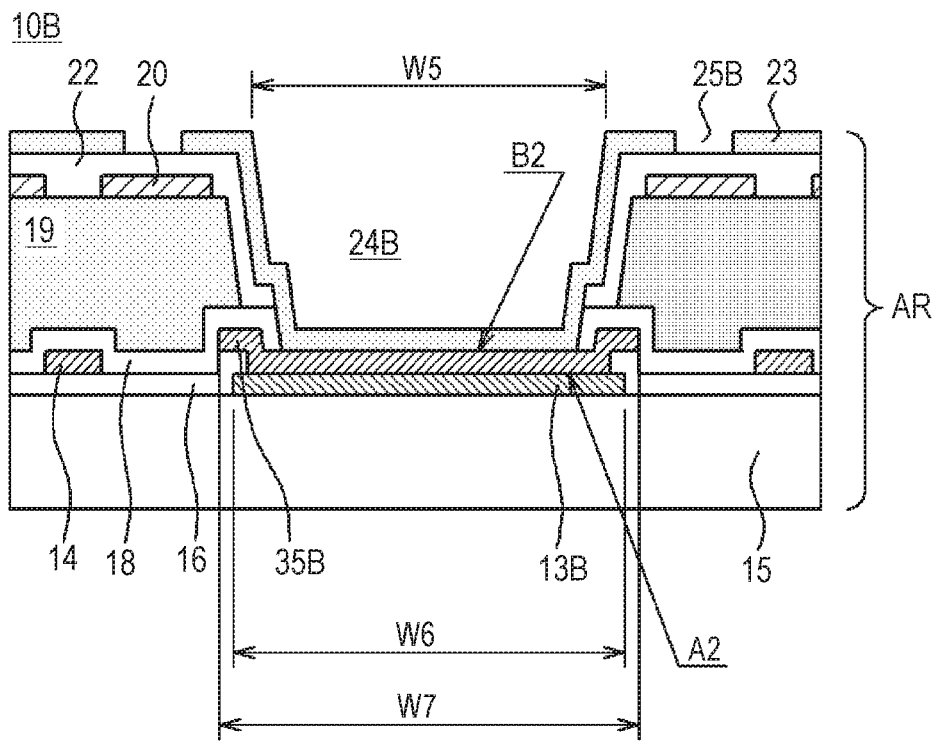
FIG. 8A is a cross-sectional view taken along the line VIIIA-VIIIA of FIG. 7
Figure 8B:
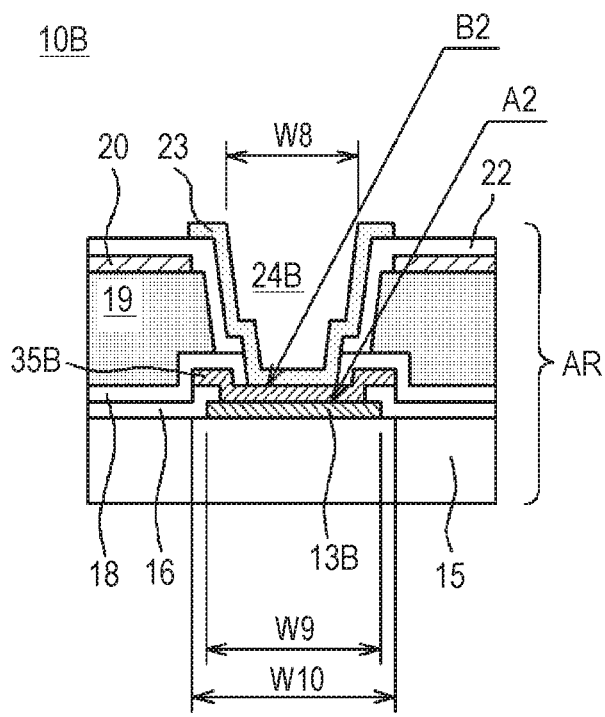
FIG. 8B is a cross-sectional view taken along the line VIIIB-VIIIB of FIG. 7.

As shown FIGS. 8A, 8B, in the second contact hole 24B, a relay terminal 35B made of metal such as aluminum or molybdenum is formed so as to overlap with the common line 13B in planar view in the same process as the source electrode S. In the second contact hole 24B of the second embodiment, the relay terminal 35B is electrically connected to the common line 13B at a connection portion A2 on the lower layer side so as to pierce through the gate insulating film 16 as well as the upper electrode 23 is electrically connected to the relay terminal 35B at a connection portion B2 on the upper layer side so as to pierce through the insulating film for electrodes 22, the lower electrode 20, the interlayer resin film 19 and the passivation film 18.

The connection portion A2 and the connection portion B2 overlap with each other in planar view. Generally, a sidewall surface of the contact hole is not vertical and slanted, therefore, the deeper the depth of the contact hole is, the larger the size of the contact hole becomes, which leads to the reduction of aperture ratio. However, the contact hole is made to have two tiers by providing with the relay terminal 35B as in the liquid crystal display panel 10B of the second embodiment, thereby reducing the reduction of aperture ratio by the second contact hole 24B. Particularly, when the contact hole 24B pierces through the interlayer resin film 19 which is a thick film, the effect of reducing the width of the contact hole 24B is prominently presented. It is also preferable that plural relay terminals 35B are provided to increase the number of tiers of the relay terminals 35B.

In the liquid crystal display panel 10B of the second embodiment, a width W6 of the common line 13B in the row direction and a width W7 of the relay terminal 35B are wider than the maximum width W5 of a concave portion of the second contact hole 24B in the row direction in the display area (W5<W6, W5<W7) as shown in FIG. 8A. Furthermore, a width W9 of the common line 13B in the column direction and a width W10 of the relay terminal 35B are wider than the maximum width W8 of a concave portion of the second contact hole 24B in the column direction in the display area (W8<W9, W8<W10) as shown in FIG. 8B.

As described above, the liquid crystal display panel 10B of the second embodiment is configured so that the non-transparent area in which the common line 13B overlaps with the relay terminal 35B covers the concave portion of the second contact hole 24B in planar view, thereby shielding the area where alignment failures due to the concave portion of the second contact hole 24B occur. Additionally, disclination generated at the boundary of areas between two kinds of slit openings in which rotation directions of liquid crystal molecules are different from each other can be shielded by the broad and non-transparent common line 13B and the relay terminal 35B. Also in the liquid crystal display panel 10B of the second embodiment, the connection state between the upper electrode 23 and the common wiring line COM in the non-display area and the connection state between the common line 13B and the common wiring line COM are the same as in the case of the liquid crystal display panel 10A of the first embodiment.

Third Embodiment

Next, a liquid crystal display panel 10C according to a third embodiment will be explained with reference to FIG. 9 and FIG. 10A. In the liquid crystal display panel 10C of the third embodiment, the same reference numerals are given to portions having the same structure as the liquid crystal display panel 10B of the second embodiment, in which a subscript of the reference numerals is changed to "C" and the detailed description thereof is omitted. The liquid crystal display panel 10C of the third embodiment differs from the liquid crystal display panel 10B of the second embodiment mainly in portions of slit openings 25C and a second contact hole 24C.

Figure 9:
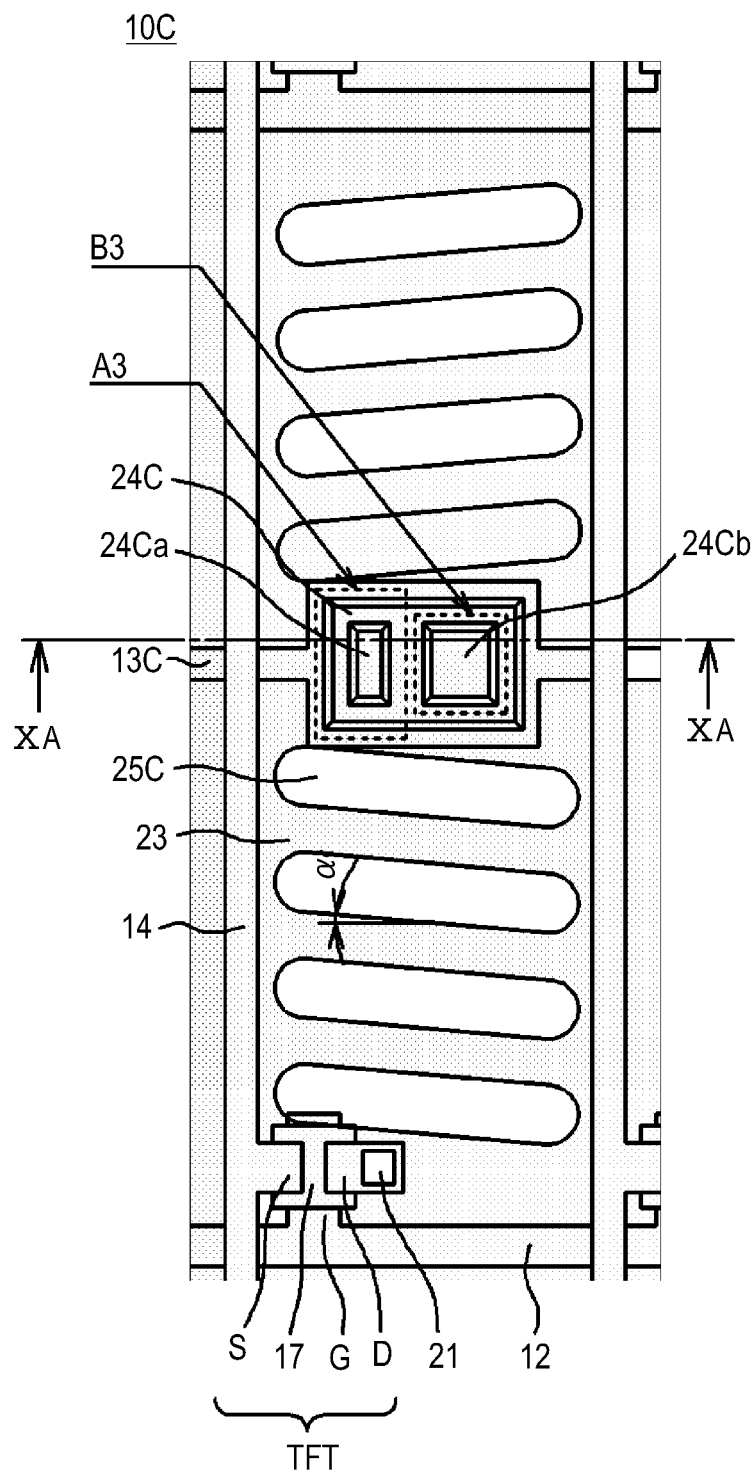
FIG. 9 is a plan view showing the outline of the array substrate of one sub-pixel according to a third embodiment.

As shown in FIG. 9, the direction of rubbing processing of the liquid crystal display panel 10C of the third embodiment is in the extending direction of the scanning line 12 (row direction). The extending direction of the slit openings 25C at the upper side sub-pixels are slanted at −5 degrees in the clockwise direction with respect to the direction of rubbing processing, and the extending direction of the slit openings 25C at the lower side sub-pixels is slanted at +5 degrees in the clockwise direction with respect to the direction of rubbing processing. There are two areas in which the rotation directions of liquid crystal molecules are different in sub-pixels at the upper side and the lower side. A common line 13C of the liquid crystal display panel 10C of the third embodiment is provided at the boundary between the two areas in which the rotation directions of liquid crystal molecules are different from each other. According to this, in the liquid crystal display panel 10C of the third embodiment, disclination generated at the boundary of areas between two kinds of slit openings in which rotation directions of liquid crystal molecules are different from each other can be shielded by the non-transparent common line 13C.

Figure 10A:
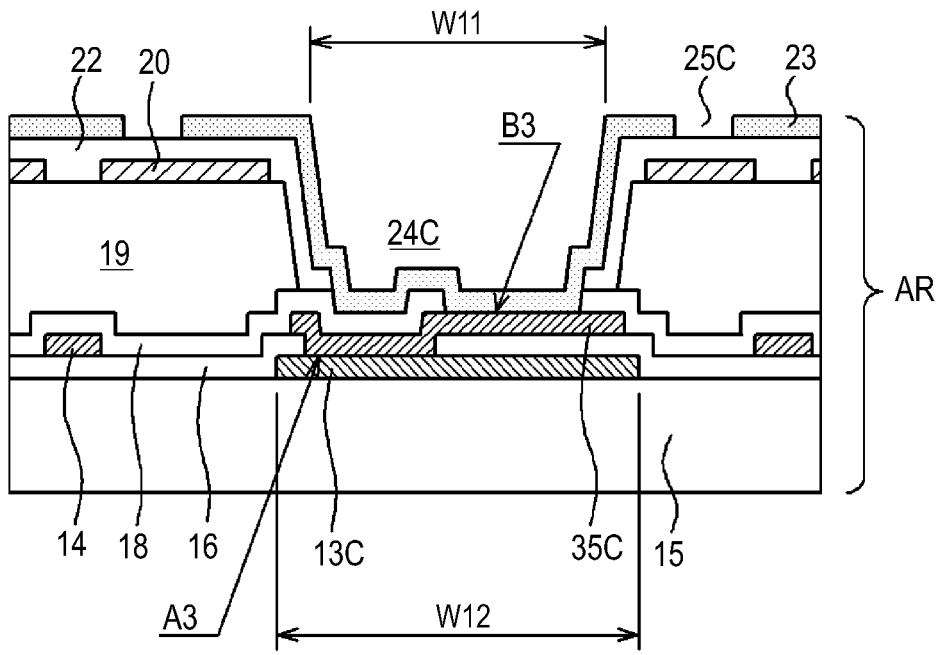
FIG. 10A is a cross-sectional view taken along the line XA-XA of FIG. 9

As shown in FIG. 10A, in the liquid crystal display panel 10C of the third embodiment, a relay terminal 35C made of non-transparent metal such as aluminum or molybdenum is formed so as to overlap with the common line 13C in planar view in the same process as the source electrode S in the same manner as the semiconductor device panel 10B of the second embodiment. In the second contact hole 24C of the third embodiment, the relay terminal 35C is electrically connected to the common line 13C at a connection portion A3 on the lower layer side by piercing through the gate insulating film 16 as well as the upper electrode 23 is electrically connected to the relay terminal 35C at a connection portion B3 on the upper layer side by piercing through the inter-electrode insulating film 22, the lower electrode 20, the interlayer resin film 19 and the passivation film 18. Here, the connection portion A2 and the connection portion B2 of the second embodiment overlap with each other in planar view, however, the third embodiment is different from the second embodiment in a point that the connection portion A3 does not overlap with the connection portion B3 in planar view. The liquid crystal display panel 10C of the third embodiment has the advantage of reducing the reduction of the aperture ratio by the second contact hole 24C in the same manner as the liquid crystal display panel 10B of the second embodiment.

As shown in FIG. 10A, the liquid crystal display panel 10C of the third embodiment is configured so that the non-transparent area in which the common line 13C overlaps with the relay terminal 35C covers the concave portion of the second contact hole 24C in planar view, thereby shielding the area where alignment failures due to the concave portion of the second contact hole 24C occur in the same manner as the liquid crystal display panel 10B of the second embodiment. Additionally, an area of disclination generated at the boundary between areas of two kinds of slit openings in which rotation directions of liquid crystal molecules are different from each other can be shielded by the non-transparent area in which the common line 13C overlaps with and the relay terminal 35C. Also in the liquid crystal display panel 10C of the third embodiment, the connection state between the upper electrode 23 and the common wiring line COM in the non-contact area and the connection state between the common line 13B and the common wiring line COM are the same as in the case of the liquid crystal display panel 10A of the first embodiment.

Fourth Embodiment

Next, a liquid crystal display panel 10D according to a fourth embodiment will be explained with reference to FIG. 10B. In the liquid crystal display panel 10D of the fourth embodiment, the same reference numerals are given to portions having the same structure as the liquid crystal display panel 10C of the third embodiment, in which a subscript of the reference numerals is changed to "D" and the detailed description thereof is omitted. The liquid crystal display panel 10D of the fourth embodiment differs from the liquid crystal display panel 10C of the third embodiment mainly in positional relation of a connection portion B4 on the upper layer side and a connection portion A4 on the lower layer side.

Figure 10B:
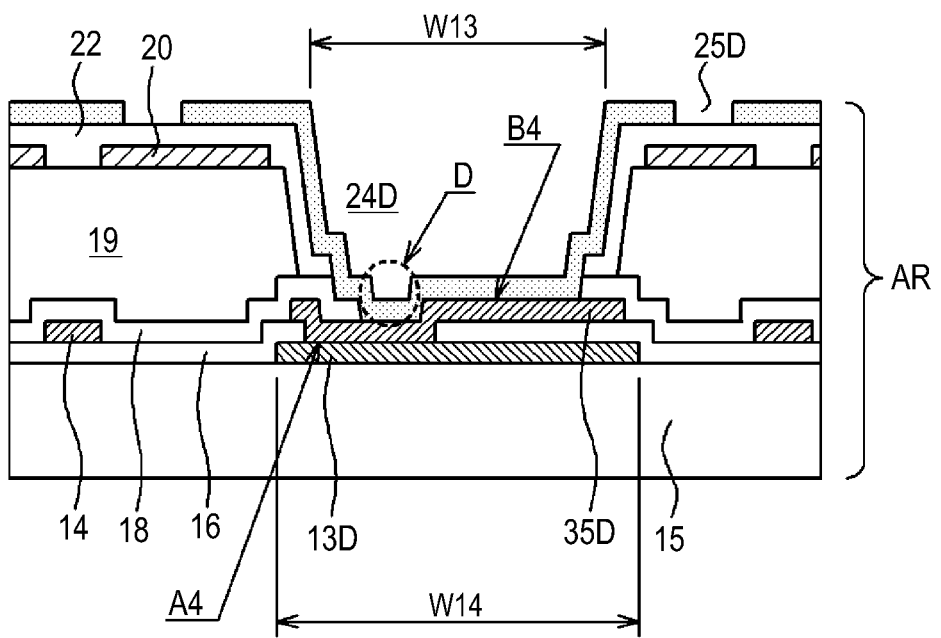
FIG. 10B is a cross-sectional view corresponding to FIG. 10A according to a fourth embodiment.

As shown in FIG. 10B, in the liquid crystal display panel 10D of the fourth embodiment, positions of the connection portion A4 and the connection portion B4 are shifted while partially overlapping each other in planar view. The liquid crystal display panel 10D of the fourth embodiment having the above structure also has the advantage of reducing the reduction of aperture ratio due to a second contact hole 24D and the advantage of shielding the area of disclination generated at the boundary between areas of two kinds of slit openings in which rotation directions of liquid crystal molecules are different from each other in the same manner as the liquid crystal display (panel) 10C of the third embodiment. As shown in FIG. 10B, in the liquid crystal display (panel) 10D of the fourth embodiment, the connection portion A4 on the lower side partially overlaps with a side surface of the connection portion B4 on the upper side in planar view, a concave portion is formed at the bottom of the connection portion B4 on the upper side. At the concave portion, the film discontinuity in the upper electrode 23 is liable to occur. In the case of the liquid crystal display panel 10C of the third embodiment in which the connection portion A3 on the lower side does not overlap with the connection portion B3 on the upper layer side, the concave portion is not formed at the bottom of the connection portion B3 on the upper side, therefore, the film discontinuity hardly occur.

Fifth Embodiment

Next, a liquid crystal display panel 10E according to a fifth embodiment will be explained with reference to FIG. 11. In the liquid crystal display panel 10E of the fifth embodiment, the same reference numerals are given to portions having the same structure as the liquid crystal display panel 10C of the third embodiment, in which a subscript of the reference numerals is changed to "E" and the detailed description of the portion is omitted. The liquid crystal display panel 10E of the fifth embodiment differs from the liquid crystal display panel 10C of the third embodiment mainly in the shape of slit openings 25E.

Figure 11:
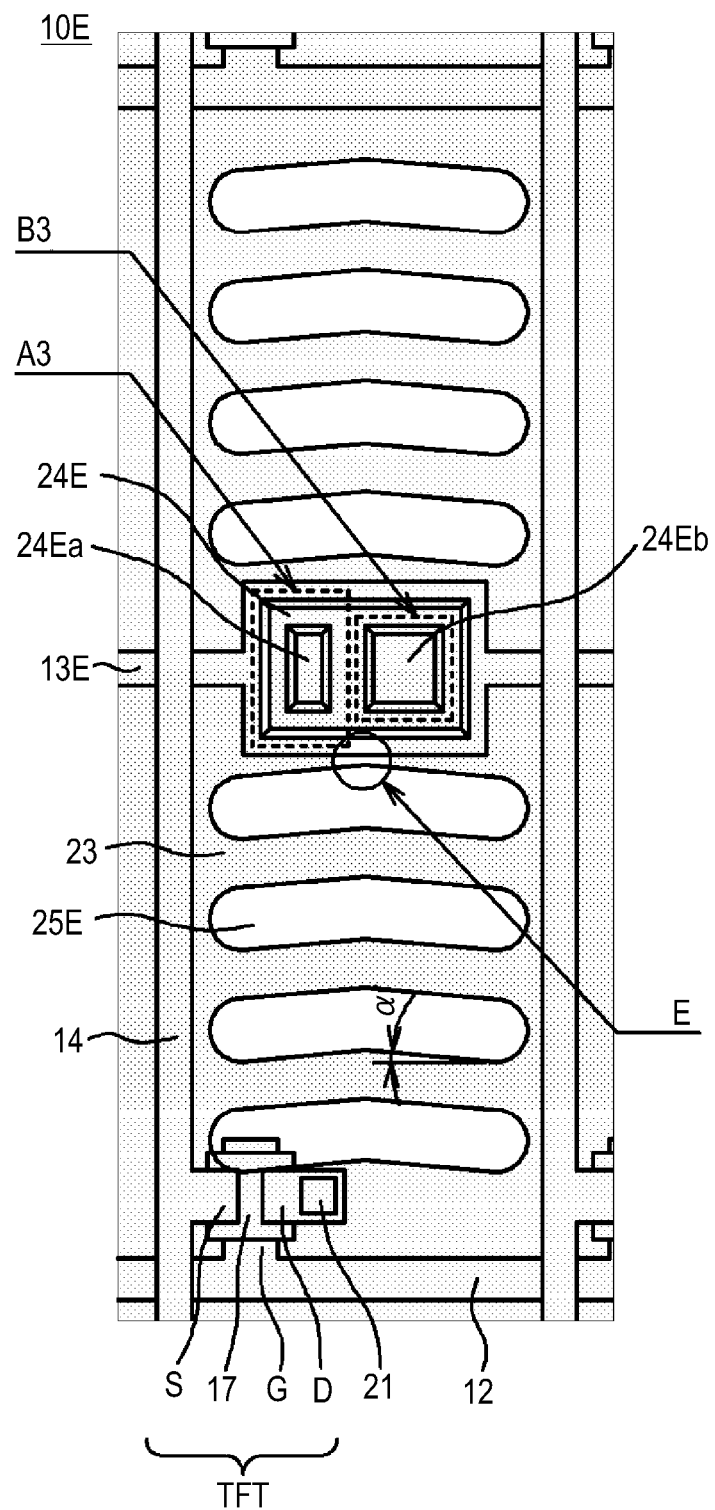
FIG. 11 is a plan view showing the outline of the array substrate of one pixel according to a fifth embodiment.

As shown in FIG. 11, the slit openings 25E of the liquid crystal display panel 10E are formed to be a reverse V-shape obtained by rotating the dog-leg shape by 90 degrees. Therefore, the direction of rubbing processing will be the extending direction of the scanning line 12 (row direction). A second contact hole 24E is formed in the vicinity of a bending portion of the slit opening 25E having the reverse V-shape (a position "E" in FIG. 11). Accordingly, the area of disclination generated at the boundary between areas of two kinds of slit openings in which rotation directions of liquid crystal molecules are different from each other can be shielded by the non-transparent area in which the common line 13E overlaps with the relay terminal 35E in the same manner as in the liquid crystal display panel 10C of the third embodiment.

In the above embodiments, the upper electrode operates as the common electrode, however, the application can be applied also to a liquid crystal display panel in which the lower electrode operates as the common electrode because the common electrode can be formed over all sub-pixels in the display area also in the liquid crystal display panel in which the lower electrode operates as the common electrode as shown in FIGS. 7 and 8 in Patent Document 2 described above. The second contact hole for connecting the common electrode to the common line in the display area DA may be provided all sub-pixels in the display area or may be provided some of sub-pixels. The relay terminal which divides the second contact hole is formed in the same process as the source electrode to prevent the increase of man-hours in the embodiments, however, it is not limited to this and the relay terminal may be formed in a different process from the source electrode. It is also preferable that plural relay terminals are provided and the second contact hole can be divided into contact holes of three tiers or more.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. A liquid crystal display panel comprising:
   a pair of substrates arranged opposite to each other with a liquid crystal layer sandwiched therebetween,
   one of the pair of substrates including
      plural scanning lines and signal lines arranged in a matrix state in a display area,
      a common wiring line formed along a peripheral edge portion of the display area,
      an interlayer resin film formed at least over the whole display area, and
      a lower electrode and an upper electrode made of a transparent conductive material arranged opposite to each other with an inter-electrode insulating film sandwiched therebetween,
   wherein the upper electrode includes plural slits formed in each pixel area sectioned in a row direction and a column direction by the scanning line and the signal line in the display area in planar view,
   wherein one of the upper electrode and the lower electrode is electrically connected to the common wiring line and operates as a common electrode,
   wherein in the display area, a common line is formed along the scanning line, the common line is made of a light shielding metal material, and the electrode operating as the common electrode is electrically connected to the common line through a contact hole in each pixel area, and the common line is electrically connected to the common wiring line at the peripheral edge portion of the display area,
   wherein the common line has a connection portion that is electrically connected to the electrode operating as the common electrode,
   wherein a width of the connection portion in the row direction is wider than a maximum width of the contact hole in the row direction, and a width of the connection portion in the column direction is wider than a maximum width of the contact hole in the column direction, and
   wherein the connection portion is formed at a position in which the connection portion overlaps with the contact hole in planar view so as to shield an opening of the contact hole.

2. The liquid crystal display panel according to claim 1, further comprising:
   at least one relay terminal formed between the common line and the common electrode at a position where the relay terminal overlaps with the contact hole,
   wherein the electrode operating as the common electrode is electrically connected to the relay terminal to be electrically connected to the common line through the relay terminal.

3. The liquid crystal display panel according to claim 2, wherein the relay terminal is formed in the same layer as the signal line.

4. The liquid crystal display panel according to claim 2, wherein a connection portion between the electrode operating as the common electrode and the relay terminal does not overlap with a connection portion between the relay terminal and the common line in planar view.

5. The liquid crystal display panel according to claim 2, wherein the relay terminal is made of a non-transparent material and formed so as to shield the opening of the contact hole in planar view.

6. The liquid crystal display panel according to claim 1, wherein a first slit opening area and a second slit opening area in which rotation directions of liquid crystal molecules are reverse to each other are formed on the upper electrode, and
   the common line is formed at a boundary between the first and the second slit opening areas.

* * * * *